United States Patent
Son et al.

(10) Patent No.: US 8,458,248 B2
(45) Date of Patent: Jun. 4, 2013

(54) SYSTEM AND METHOD FOR ENABLING VPN TUNNEL STATUS CHECKING

(75) Inventors: Giyeong Son, Mississauga (CA); Chi Chiu Tse, Markham (CA); Denis Fedotenko, Waterloo (CA)

(73) Assignee: Research In Motion Limited, Waterloo (CA)

( * ) Notice: Subject to any disclaimer, the term of this patent is extended or adjusted under 35 U.S.C. 154(b) by 321 days.

(21) Appl. No.: 12/890,238

(22) Filed: Sep. 24, 2010

(65) Prior Publication Data

US 2012/0078998 A1    Mar. 29, 2012

(51) Int. Cl.
G06F 15/16 (2006.01)
G06F 15/173 (2006.01)

(52) U.S. Cl.
USPC .......... 709/203; 709/224; 709/227

(58) Field of Classification Search
USPC ....................... 709/203
See application file for complete search history.

(56) References Cited

U.S. PATENT DOCUMENTS

| | | | |
|---|---|---|---|
| 6,668,282 B1 | 12/2003 | Booth, III et al. | |
| 6,976,071 B1 | 12/2005 | Donzis et al. | |
| 7,139,829 B2 * | 11/2006 | Wenzel et al. | 709/232 |
| 7,743,411 B2 * | 6/2010 | Ying et al. | 726/15 |
| 2002/0099814 A1 | 7/2002 | Mastrianni | |
| 2005/0234954 A1 * | 10/2005 | Bailey et al. | 707/101 |
| 2006/0050674 A1 * | 3/2006 | Lee et al. | 370/338 |
| 2007/0271606 A1 | 11/2007 | Amann et al. | |
| 2009/0019537 A1 | 1/2009 | Stavrou et al. | |
| 2009/0031028 A1 * | 1/2009 | Kumar et al. | 709/227 |
| 2009/0175282 A1 * | 7/2009 | Babin et al. | 370/401 |
| 2011/0066858 A1 * | 3/2011 | Cheng et al. | 713/171 |
| 2011/0211219 A1 * | 9/2011 | Bradley et al. | 358/1.15 |

FOREIGN PATENT DOCUMENTS

| | | |
|---|---|---|
| EP | 1585263 | 10/2005 |
| WO | 2007136440 A2 | 11/2007 |

OTHER PUBLICATIONS

ITEF RFC 3706—A Traffic-Based Method of Detecting Dead Internet Key, url: http://www.faqs.org/rfcs/rfc3706.html.
Arjona, Ramon, "An Introduction to IPsec VPNs on Mobile Phones", url: http://msdn.microsoft.com/en-us/magazine/ee412260.aspx.
EP Application No. 10179270.3, Extended European Search Report dated Nov. 24, 2010.

* cited by examiner

*Primary Examiner* — Wing F Chan
*Assistant Examiner* — David X Yi
(74) *Attorney, Agent, or Firm* — Moffat & Co.

(57) ABSTRACT

A method and apparatus for virtual private network ('VPN') liveness checking, the method, upon expiration of a timer, sending, over a VPN tunnel, a request to a server located behind a terminator of the VPN; checking whether a response to the request is received within a time interval; if a response to the request is received, resetting the timer; and if a response to the request is not received within the time interval, resending the request if a request count is less than a set number of requests; or providing an inactive tunnel indication to a VPN client manager if the request count equals the set number of requests.

22 Claims, 3 Drawing Sheets

SYSTEM AND METHOD FOR ENABLING VPN TUNNEL STATUS CHECKING

FIELD OF THE DISCLOSURE

The present disclosure relates to virtual private networks (VPN) and in particular to VPN tunnel state checking.

BACKGROUND

A virtual private network is a network that uses a public telecommunication infrastructure such as the Internet to create a secure virtual connection between two or more entities for communication. This is accomplished through the use of a "tunnel" between the two or more entities. A VPN may utilize various protocols to establish the tunnel and to secure communications between the sender and recipient. For example, one protocol is Internet Protocol Security (IPsec). In this protocol, each IP packet of a data stream is authenticated and encrypted and the protocol is used to protect data flows on the virtual private network.

Various events can cause a tunnel to become inactive and thus a VPN tunnel state needs to be checked periodically during an idle time. A handheld or mobile device utilizes a special VPN liveness check mechanism called dead peer detection (DPD). A DPD-based liveness check is performed by the VPN components on the client and the server. Such DPD activity is described in the Internet Engineering Task Force (IETF) request for comments (RFC) 3706, the contents of which are incorporated herein by reference. The document describes a method for detecting a dead Internet Key Exchange (IKE) peer. DPD utilizes IPsec traffic patterns to minimize the number of IKE messages that are needed to confirm liveness. The VPN client in a handheld initiates or requests a VPN liveness check when the VPN tunnel is in an idle state.

However, in some cases, VPN clients or servers do not support a DPD based liveness check. In other cases, a client or server may disable the DPD liveness check feature. If this is these situations, there may be no way to check that the VPN tunnel is still alive during an idle time. The VPN tunnel being down creates a situation where there is no service to the device, leading to delays in communication.

BRIEF DESCRIPTION OF THE DRAWINGS

The present disclosure will be better understood with reference to the drawings in which.

DETAILED DESCRIPTION

The present disclosure provides a method at a mobile device comprising: upon expiration of a timer, sending, over a VPN tunnel, a request to a server located behind a terminator of the VPN; checking whether a response to the request is received within a time interval; if a response to the request is received, resetting the timer; and if a response to the request is not received within the time interval, resending the request if a request count is less than a set number of requests; or providing an inactive tunnel indication to a VPN client manager if the request count equals the set number of requests.

The present disclosure further provides a mobile device comprising: a processor; and a communications subsystem, wherein the processor and communications subsystem cooperate to: upon expiration of a timer, send, over a VPN tunnel, a request to a server located behind a terminator of the VPN; check whether a response to the request is received within a time interval; if a response to the request is received, reset the timer; and if a response to the request is not received within the time interval, resend the request if a request count is less than a set number of requests; or provide an inactive tunnel indication to a VPN client manager if the request count equals the set number of requests.

An alternative to a DPD-based VPN liveness check may be provided when DPD-based liveness check is not available. In one embodiment, the VPN tunnel state can be checked using a domain name server (DNS) in cases where no DPD-based VPN liveness check is available. The DNS component in the handheld should provide a reliable application program interface (API) to handle DNS query-based VPN keep alive checks.

In one embodiment, a DNS-based VPN liveness check that is similar to the DPD-based liveness check is provided. In this embodiment, the VPN client and server components are not involved in performing the liveness check.

A timer may be used to determine when the liveness check should occur. For example, a VPN liveness timer may expire every six minutes. If the timer expires, a handheld may initiate a DNS-based VPN liveness check. The mobile device requests a DNS client component to send a DNS PTR (resource record) request to the DNS server. As will be appreciated the DNS server is closely located behind the VPN terminator by the VPN tunnel. If the DNS client component does not receive any response within a certain timer interval, it retransmits the DNS PTR request several times to a maximum number of VPN liveness checks. If the transaction fails to receive a response, the DNS client component then returns a result status of failure to the VPN tunnel management component. In this way, the VPN tunnel management component might know that the tunnel for the VPN is no longer alive.

Figure 1:
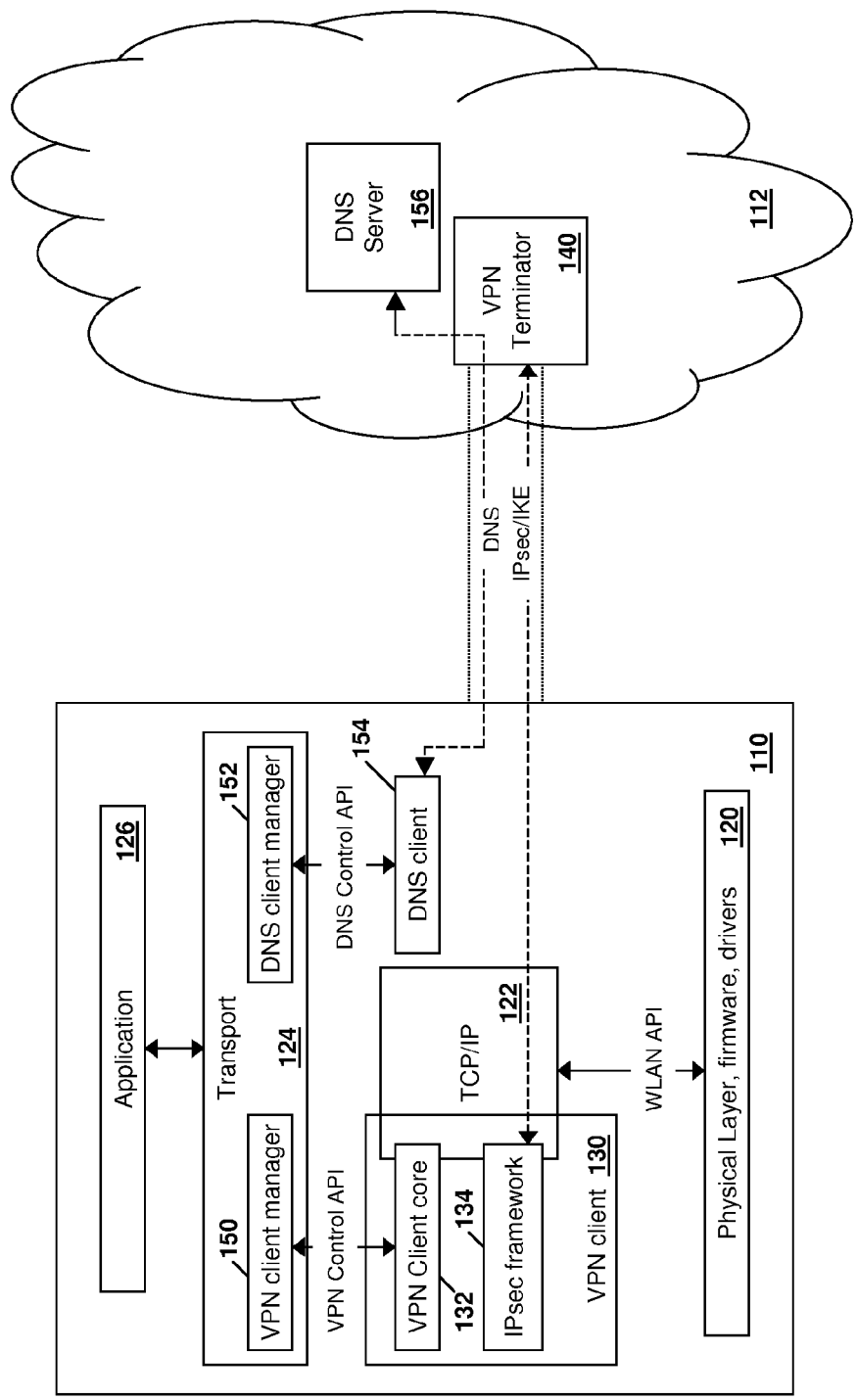
FIG. 1 is a block diagram of an exemplary VPN tunneling architecture.

Reference is now made to FIG. 1, which is a block diagram illustrating an exemplary VPN tunneling architecture. As will be appreciated by those skilled in the art, the embodiment of FIG. 1 is merely meant as an example and other VPN tunneling architectures could be used with the present methods and systems.

In the embodiment of FIG. 1 a mobile device 110 communicates with a corporate network 112. Mobile device 110 may be any device capable of data communications, including but not limited to a user equipment, network enabled cellular telephone, personal digital assistant, a laptop computer, among others.

In mobile device 110, a physical layer 120 is utilized to provide communication over a particular network. For example, in one embodiment the network may be a wireless fidelity (WiFi) network, where the physical layer 120 is used to provide communication between the handheld device and the access point (not shown). In other embodiments, a cellular network such as a global system for mobile communications (GSM), code division multiple access (CDMA), universal mobile terrestrial service (UMTS), long-term evolution (LTE), long-term evolution advanced (LTE-A), among others, may be used for data reception and transmission.

A Transmission Control Protocol/Internet Protocol (TCP/IP) layer 122 sits on top of the physical layer 120 and is used for communications.

Transport 124 provides an interface for applications 126 can further communicate through TCP/IP layer 122. The transport 124 is, in one embodiment, the main handler to control the connections over the network, and directly interacts with underlying network components such as WiFi, VPN, TCP and DNS.

Transport 124 includes a VPN client manager 150 which is used to manage a VPN client 130 and includes a control API communicating with the VPN client core.

VPN client 130 communicates with a VPN server (not shown) on VPN terminator 140 in corporate network 112. VPN client 130 includes a VPN client core 132 and an IPsec framework 134. The use of such components are described, for example, in the IETF specifications for IKE and IPsec.

Transport 124 further includes a DNS client manager 152, which is used for communicating with the domain name server 156 through a DNS client 154. Application program interfaces may be established for DNS client 154 to allow for DNS liveness checking, as described below.

Transport 124 is also a handler for the VPN liveness check. The component initiates or requests a VPN liveness check when the VPN tunnel is in an idle state. The mobile device 110 utilizes a VPN liveness timer to initiate VPN liveness check. The timer is reset when any network traffic occurs through the VPN tunnel. Therefore, the timer only progresses when the VPN tunnel goes into an idle state.

Once the timer expires, the transport 124 performs a VPN liveness check. As indicated above, two options for VPN liveness checking are provided in the present disclosure for VPN liveness check. These are the DPD-based VPN liveness check and the DNS-based liveness check. The decision to select which method depends on the availability of the DPD-based VPN liveness check.

In particular, if the DPD-based VPN liveness check is not available the handheld utilizes DNS to check the VPN tunnel state.

The determination of whether DPD-based VPN liveness is made at the time that the VPN is established. Thus, during VPN establishment the device may request DPD capability and receive a response from the gateway. In this way a flag could be set on the device to indicate whether or not DPD-based VPN liveness check is available. The flag could be used in a check to determine which liveness check to use, and also to configure timers if there are different timer values for the different liveness checks. For example, the transport 124 maintains the liveness check timer and may use a different timer value for DNS than for DPD liveness checking.

Figure 2:
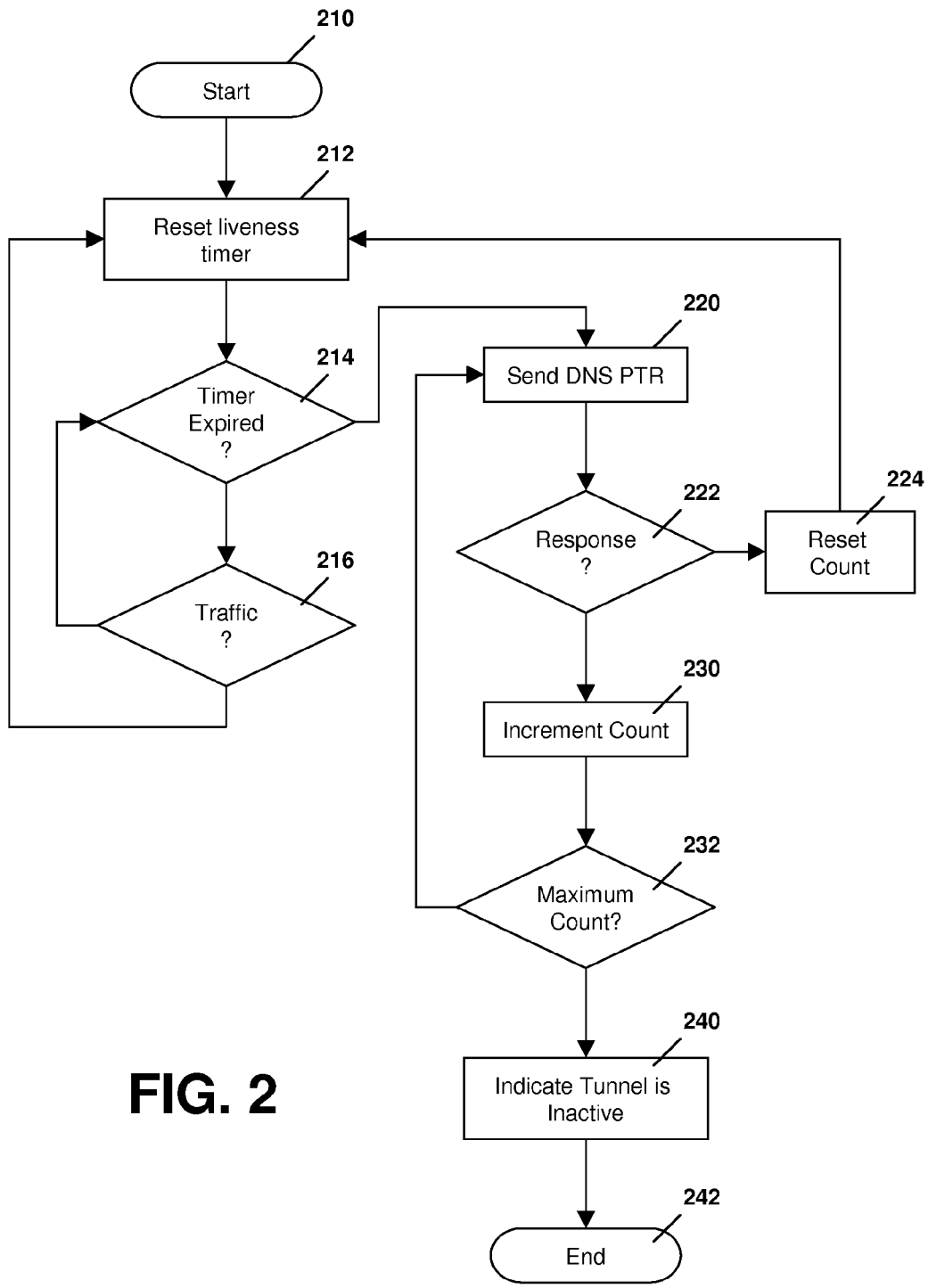
FIG. 2 is a process diagram showing use of DNS to verify VPN tunnel liveness.

Reference is now made to FIG. 2, which illustrates a process for a DNS liveness check. In FIG. 2 the process starts at block 210 and proceeds to block 212 in which the VPN liveness timer is reset. As will be appreciated by those in the art, the value for the timer can be predetermined. For example the value may be set by a mobile device manufacturer, carrier, or may be configured on the device. The value could be set during manufacture or provisioned to the device subsequently. In one embodiment, the value for a DNS liveness check timer may be set to six minutes. Further, the value of the timer may be set based on a flag on the device indicating whether DNS or DPD liveness checking should be used, as each may have a different value.

From block 212, the process proceeds to block 214 in which a check is made to determine whether the timer has expired. If the timer has not expired, the process proceeds to block 216 in which check is made to determine whether traffic has occurred through the VPN tunnel. In one embodiment, the check of block 216 can determine if a relay client protocol (RCP) ping timer has expired and the RCP ping sent. The RCP ping timer can have a value less than the timer of block 214.

If no traffic has occurred, the process proceeds from block 216 back to block 214. In this way, the process will proceed between blocks 214 and 216 until either traffic arrives or until the timer expires.

If traffic occurs, from block 216 the process proceeds back to block 212 in which the liveness timer is reset and the process then proceeds back to block 214.

From block 214, if the timer expires, the process proceeds to block 220.

In block 220, a DNS request is made. In the embodiment of FIG. 2, the DNS request is a DNS PTR request. As will be appreciated by those skilled in the art, a DNS PTR request is a resource record request in a server asking for a domain name based on an IP address. However, the use of DNS PTR requests is not meant to be limiting, and other DNS requests could be made.

The request of block 220 is sent to DNS server 156, which as will be appreciated by those skilled in the art is closely located behind VPN terminator 140.

From block 220, the process proceeds to block 222 in which a check is made to determine whether a response to the DNS PTR request of block 220 has been received from the network within a preset interval. In block 222, if a response is received then the VPN tunnel is alive and the process proceeds to block 224 in which a counter for the number of DNS PTR requests is reset. The counter is discussed in more detail below. The process then proceeds back to block 212 in which the VPN liveness timer is reset.

In one embodiment, multiple DNS-based checks are made to determine whether or not a tunnel is active. For example, a request may be made to the network through the VPN tunnel before it is determined that the tunnel is no longer active. A counter may be maintained to keep track of the number of DNS PTR requests made.

From block 222, if a response is not received within a predetermined timed interval, the process then proceeds to block 230 in which a count is incremented.

The process then proceeds to block 232 in which a check is made to determine whether or not the maximum count has been reached. This maximum count indicates the maximum number of DNS requests sent from the mobile device before the tunnel is deemed dead. The value is predetermined by a mobile device manufacturer, carrier, other network side entity, or may be configured on the device.

If the maximum count has not been reached, the process proceeds back to block 220 in which a further DNS PTR request is sent over the VPN tunnel.

From block 232, if the maximum count has been reached, the process proceeds to block 240 in which the VPN tunnel is determined to be inactive, and the DNS client component returns a result status failure to VPN client manager 150 within transport 124. Transport 124 can then initiate tunnel take down or re-establishment procedures on mobile device 110. As will be appreciated by those in the art, an inactive tunnel could be one that is dead, suspended, or unresponsive for any reason, and the present disclosure is not limited to any particular reason for inactivity in a tunnel.

From block 240, the process proceeds to block 242 and ends.

As will be appreciated by those in the art, the interval between the successive DNS PTR messages may be varied. For example, after a DNS PTR request is sent, the delay interval for the check of block 222 may be 2 seconds. After the second DNS PTR message is sent, the delay interval that the check at block 222 waits may again be 2 seconds. After a further DNS PTR message is sent, the delay may be 4 seconds and after a fourth DNS PTR message is sent, the interval that may be waited for by the check of block 222 may be 8 seconds.

Figure 3:
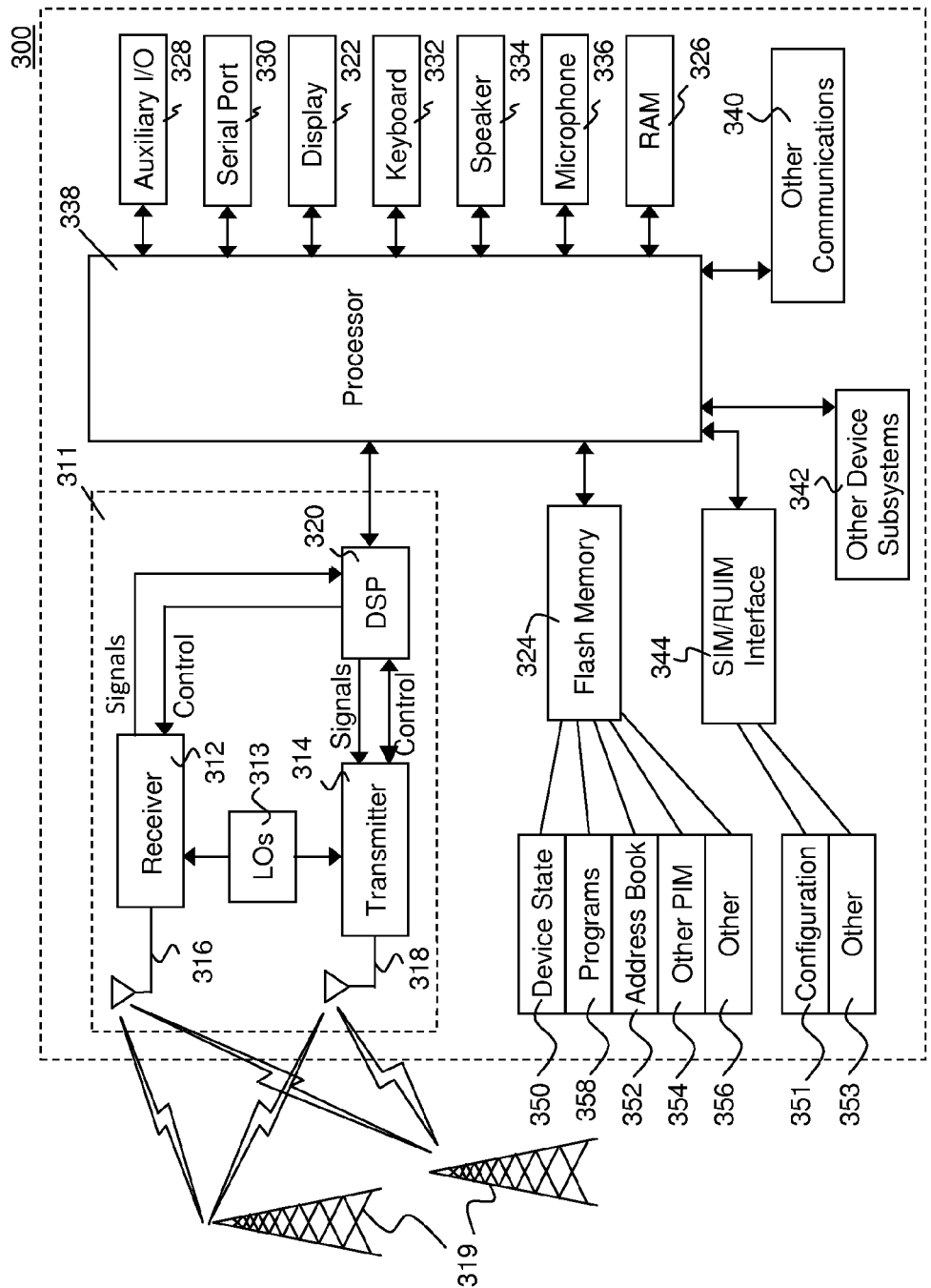
FIG. 3 is a block diagram of an exemplary mobile device.

As will be appreciated, the maintaining of timers, checking liveness including sending requests and potentially receiving responses is done on processor of a mobile device, in combination with a communications subsystem of the mobile device. One such exemplary mobile device is illustrated below with reference to FIG. 3. The mobile device of FIG. 3 is however not meant to be limiting and other mobile devices could also be used.

Mobile device 300 is typically a two-way wireless communication device having voice and data communication capabilities. Mobile device 300 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 300 is enabled for two-way communication, it will incorporate a communication subsystem 311, including both a receiver 312 and a transmitter 314, as well as associated components such as one or more antenna elements 316 and 318, local oscillators (LOs) 313, and a processing module such as a digital signal processor (DSP) 320. As will be apparent to those skilled in the field of communications, the particular design of the communication subsystem 311 will be dependent upon the communication network in which the device is intended to operate.

Network access requirements will also vary depending upon the type of network 319. In some networks network access is associated with a subscriber or user of mobile device 300. A mobile device may require a removable user identity module (RUIM) or a subscriber identity module (SIM) card in order to operate on a network. The SIM/RUIM interface 344 is normally similar to a card-slot into which a SIM/RUIM card can be inserted and ejected like a diskette or PCMCIA card. The SIM/RUIM card can have memory and hold many key configurations 351, and other information 353 such as identification, and subscriber related information.

When required network registration or activation procedures have been completed, mobile device 300 may send and receive communication signals over the network 319. As illustrated in FIG. 3, network 319 can consist of multiple base stations communicating with the mobile device.

Signals received by antenna 316 through communication network 319 are input to receiver 312, which may perform such common receiver functions as signal amplification, frequency down conversion, filtering, channel selection and the like, and in the example system shown in FIG. 3, analog to digital (A/D) conversion. A/D conversion of a received signal allows more complex communication functions such as demodulation and decoding to be performed in the DSP 320. In a similar manner, signals to be transmitted are processed, including modulation and encoding for example, by DSP 320 and input to transmitter 314 for digital to analog conversion, frequency up conversion, filtering, amplification and transmission over the communication network 319 via antenna 318. DSP 320 not only processes communication signals, but also provides for receiver and transmitter control. For example, the gains applied to communication signals in receiver 312 and transmitter 314 may be adaptively controlled through automatic gain control algorithms implemented in DSP 320.

Mobile device 300 generally includes a processor 338 which controls the overall operation of the device. Communication functions, including data and voice communications, are performed through communication subsystem 311. Processor 338 also interacts with further device subsystems such as the display 322, flash memory 324, random access memory (RAM) 326, auxiliary input/output (I/O) subsystems 328, serial port 330, one or more keyboards or keypads 332, speaker 334, microphone 336, other communication subsystem 340 such as a short-range communications subsystem and any other device subsystems generally designated as 342. Serial port 330 could include a USB port or other port known to those in the art.

Some of the subsystems shown in FIG. 3 perform communication-related functions, whereas other subsystems may provide "resident" or on-device functions. Notably, some subsystems, such as keyboard 332 and display 322, for example, may be used for both communication-related functions, such as entering a text message for transmission over a communication network, and device-resident functions such as a calculator or task list.

Operating system software used by the processor 338 may be stored in a persistent store such as flash memory 324, which may instead be a read-only memory (ROM) or similar storage element (not shown). Those skilled in the art will appreciate that the operating system, specific device applications, or parts thereof, may be temporarily loaded into a volatile memory such as RAM 326. Received communication signals may also be stored in RAM 326.

As shown, flash memory 324 can be segregated into different areas for both computer programs 358 and program data storage 350, 352, 354 and 356. These different storage types indicate that each program can allocate a portion of flash memory 324 for their own data storage requirements. Processor 338, in addition to its operating system functions, may enable execution of software applications on the mobile device. A predetermined set of applications that control basic operations, including at least data and voice communication applications for example, will normally be installed on mobile device 300 during manufacturing. Other applications could be installed subsequently or dynamically.

Applications and software, such as DNS client 154, VPN client 130, DNS client manager 152 and VPN client manager 150, among others, may be stored on any computer readable storage medium. The computer readable storage medium may be a tangible or intransitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application may have the ability to send and receive data items, via the wireless network 319. In one embodiment, the PIM data items are seamlessly integrated, synchronized and updated, via the wireless network 319, with the mobile device user's corresponding data items stored or associated with a host computer system. Further applications may also be loaded onto the mobile device 300 through the network 319, an auxiliary I/O subsystem 328, serial port 330, short-range communications subsystem 340 or any other suitable subsystem 342, and installed by a user in the RAM 326 or a non-volatile store (not shown) for execution by the processor 338. Such flexibility in application installation increases the functionality of the device and may provide enhanced on-device functions, communication-related functions, or both. For example, secure communication applications may enable electronic commerce functions and other such financial transactions to be performed using the mobile device 300.

In a data communication mode, a received signal such as a text message or web page download will be processed by the communication subsystem 311 and input to the processor 338, which may further process the received signal for output to the display 322, or alternatively to an auxiliary I/O device 328.

A user of mobile device 300 may also compose data items such as email messages for example, using the keyboard 332, which may be a complete alphanumeric keyboard or telephone-type keypad, among others, in conjunction with the display 322 and possibly an auxiliary I/O device 328. Such composed items may then be transmitted over a communication network through the communication subsystem 311.

For voice communications, overall operation of mobile device 300 is similar, except that received signals would typically be output to a speaker 334 and signals for transmission would be generated by a microphone 336. Alternative voice or audio I/O subsystems, such as a voice message recording subsystem, may also be implemented on mobile device 300. Although voice or audio signal output is preferably accomplished primarily through the speaker 334, display 322 may also be used to provide an indication of the identity of a calling party, the duration of a voice call, or other voice call related information for example.

Serial port 330 in FIG. 3 would normally be implemented in a personal digital assistant (PDA)-type mobile device for which synchronization with a user's desktop computer (not shown) may be desirable, but is an optional device component. Such a port 330 would enable a user to set preferences through an external device or software application and would extend the capabilities of mobile device 300 by providing for information or software downloads to mobile device 300 other than through a wireless communication network. The alternate download path may for example be used to load an encryption key onto the device through a direct and thus reliable and trusted connection to thereby enable secure device communication. As will be appreciated by those skilled in the art, serial port 330 can further be used to connect the mobile device to a computer to act as a modem.

Other communications subsystems 340, such as a short-range communications subsystem, is a further optional component which may provide for communication between mobile device 300 and different systems or devices, which need not necessarily be similar devices. For example, the subsystem 340 may include an infrared device and associated circuits and components or a Bluetooth™ communication module to provide for communication with similarly enabled systems and devices. Other communications subsystems 340 may also include WiFi™ or WiMAX™ communications circuits for communicating with an access point (not shown)

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a mobile device comprising:
upon expiration of a timer, sending, over a VPN tunnel a request to a server located behind a terminator of the VPN;
checking whether a response to the request is received within a time interval;
if a response to the request is received, resetting the timer; and
if the response to the request is not received within the time interval, resending the request if a request count is less than a set number of requests; or providing an inactive tunnel indication to a VPN client manager if the request count equals the set number of requests;
wherein the timer is reset only when data is received at the mobile device over the VPN tunnel.

2. The method of claim 1, wherein the server is a domain name server and the request is a domain name server PTR request.

3. The method of claim 2, wherein the request utilizes a domain name server client component of the mobile device.

4. The method of claim 3, wherein the domain name server client component includes application program interfaces for handling the request and response.

5. The method of claim 1, wherein the time interval is increased upon resending the request.

6. The method of claim 5, wherein the request count is four, and the time interval is two seconds for a first request, two seconds for a second request, four seconds for a third request and eight seconds for a fourth request.

7. The method of claim 1, wherein the timer expires if the VPN tunnel is in an idle state and no traffic occurs for a preset duration.

8. The method of claim 7, wherein the timer is reset if a relay client protocol ping timer expires.

9. The method of claim 1, wherein the sending of the request to the server only occurs if dead peer detection liveness checking is unavailable.

10. The method of claim 9, wherein the mobile device sets a flag indicating whether dead peer detection liveness checking is available on establishment of the VPN.

11. The method of claim 1, wherein the VPN client manager initiates tunnel take down or re-establishment procedures upon receipt of the inactive tunnel indication.

12. A mobile device comprising:
a processor; and
a communications subsystem, wherein the processor and communications subsystem cooperate to:
upon expiration of a timer, send, over a VPN runnel, a, request to a server located behind a terminator of the VPN;
check whether a response to the request is received within a time interval;
if a response to the request is received, reset the timer; and
if the response to the request is not received within the time interval, resend the request if a request count is less than a set number of requests; or
provide an inactive tunnel indication to a VPN client manager if the request count equals the set number of requests;
wherein the timer is reset only when data is received at the mobile device over the VPN runnel.

13. The mobile device of claim 12, wherein the server is a domain name server and the request is a domain name server PTR request.

14. The mobile device of claim 13, further comprising a domain name server client component configured to send the request.

15. The mobile device of claim 14, wherein the domain name server client component includes application program interfaces for handling the request and response.

16. The mobile device of claim 12, wherein the time interval is increased upon resending the request.

17. The mobile device of claim 16, wherein the request count is four, and the time interval is two seconds for a first request, two seconds for a second request, four seconds for a third request and eight seconds for a fourth request.

18. The mobile device of claim 12, wherein the timer expires if the VPN tunnel is in an idle state and no traffic occurs for a preset duration.

19. The mobile device of claim 18, wherein the timer is reset if a ping timer expires.

20. The mobile device of claim 12, wherein the sending of the request to the server only occurs if dead peer detection liveness checking is unavailable.

21. The mobile device of claim 20, further comprising a flag indicating whether dead peer detection liveness checking is available, wherein the mobile device sets the flag on establishment of the VPN.

22. The mobile device of claim 12, wherein the VPN client manager initiates tunnel take down or re-establishment procedures upon receipt of the inactive tunnel indication.

* * * * *